US009860861B2

(12) United States Patent
Wu et al.

(10) Patent No.: US 9,860,861 B2
(45) Date of Patent: Jan. 2, 2018

(54) TIMING OFFSET ESTIMATION IN AN OFDM-BASED SYSTEM BY SINR MEASUREMENT

(71) Applicant: Hong Kong Applied Science and Technology Research Institute Company Limited, Hong Kong (HK)

(72) Inventors: Yueping Wu, Hong Kong (HK); Yin Yang, Shenzhen (CN); Man Wai Victor Kwan, Hong Kong (HK); Yuxian Zhang, Hong Kong (HK); Eric Kong Chau Tsang, Hong Kong (HK)

(73) Assignee: Hong Kong Applied Science and Technology Research, Hong Kong (HK)

( * ) Notice: Subject to any disclaimer, the term of this patent is extended or adjusted under 35 U.S.C. 154(b) by 80 days.

(21) Appl. No.: 15/133,237

(22) Filed: Apr. 20, 2016

(65) Prior Publication Data

US 2017/0311273 A1    Oct. 26, 2017

(51) Int. Cl.
*H04W 56/00*    (2009.01)

(52) U.S. Cl.
CPC ..... *H04W 56/001* (2013.01); *H04W 56/0035* (2013.01)

(58) Field of Classification Search
CPC ................. H04W 56/001; H04W 56/0035
See application file for complete search history.

(56) References Cited

U.S. PATENT DOCUMENTS

| 7,558,245 B2 * | 7/2009 | Laroia | H04L 27/2659 370/350 |
| 2005/0276339 A1 * | 12/2005 | Chow | H04L 27/2607 375/260 |

(Continued)

FOREIGN PATENT DOCUMENTS

TW    200937899 A    9/2009

OTHER PUBLICATIONS

International Search Report and Written Opinion issued for PCT Application No. PCT/CN2016/079703 dated Jan. 11, 2017.

(Continued)

*Primary Examiner* — Charles C Jiang
*Assistant Examiner* — Kyaw Z Soe
(74) *Attorney, Agent, or Firm* — Spruson & Ferguson (HK)

(57) ABSTRACT

A method for timing synchronization of an OFDM signal is useful for a sniffing base station (BS) to establish BS synchronization with another BS in a mobile communication system. The method comprises estimating a timing offset of the signal from a reference sampling instant. In estimating the timing offset, first determine a maximum detection range of an estimable timing offset estimated solely by an observed phase difference between two preselected pilot symbols in the signal. Then the timing offset is determined as an integer multiple of the maximum detection range plus a residual timing offset. The multiplying integer is determined from a set of candidate integers. According to a candidate integer under consideration, a (Continued)

portion of an OFDM-signal sample sequence is masked out and a resultant signal to interference plus noise ratio (SINR) is computed. The multiplying integer is determined by identifying the candidate integer having the greatest SINR.

17 Claims, 8 Drawing Sheets

(56) References Cited

U.S. PATENT DOCUMENTS

| | | | |
|---|---|---|---|
| 2005/0276364 A1* | 12/2005 | Black | H04L 25/0204 375/354 |
| 2007/0286062 A1 | 12/2007 | Gupta | |
| 2009/0074047 A1* | 3/2009 | Yang | H04L 1/20 375/227 |
| 2014/0036779 A1* | 2/2014 | Yang | H04J 11/0073 370/328 |

OTHER PUBLICATIONS

Jan-Jaap van de Beek et al., "Low-Complexity Frame Synchronization in OFDM Systems," IEEE International Conference on Universal Personal Communications, 1995.

* cited by examiner

TIMING OFFSET ESTIMATION IN AN OFDM-BASED SYSTEM BY SINR MEASUREMENT

FIELD OF THE INVENTION

The present invention generally relates to timing synchronization of an orthogonal frequency division multiplexing (OFDM) signal at a receiver. In particular, the present invention relates to a technique for estimating a timing offset of an OFDM signal with respect to a reference sampling instant by means of measuring a signal to interference plus noise ratio (SINR) of the OFDM signal after masking.

BACKGROUND

In a mobile communication system utilizing time division duplexing (TDD) of uplink and downlink signals, base stations (BSs) are required to be mutually synchronized in signal transmission in order to avoid generation of unwanted interference among different signals. One method to achieve synchronization of the BSs over the mobile communication system is to allow a first BS to sniff a radio signal from a second BS so that the first BS is time-synchronized to the second BS based on the radio signal. Furthermore, re-synchronization is sometimes required. To illustrate the need for re-synchronization, consider a situation shown in FIG. 1. A sniffing BS 110, originally time-aligned with an original master BS 120, loses synchronization with this BS 120 because, for example, the original master BS 120 becomes out-of-service. The sniffing BS 110 is then required to synchronize itself with a new master BS 130. It is possible that there was already an inherent timing difference between the original master BS 120 and the new master BS 130 in signal transmission. Besides, a signal path 125 between the original master BS 120 and the sniffing BS 110 is often different in length with another signal path 135 for signal transmission from the new master BS 130 to the sniffing BS 110. Hence, it is often that at the sniffing BS 110, a received signal sent from the new master BS 130 is not time-aligned with another received signal originated from the original master BS 120. Timing synchronization of the new master BS 130's signal at the sniffing BS 110 is required.

Due to various advantages, most of present-day and future mobile communication systems, such as a Long Term Evolution (LTE) system, use OFDM for data transmission. A correlation method for establishing timing synchronization of an OFDM signal is provided by Jan-Jaap van de Beek et al., in "Low-Complexity Frame Synchronization in OFDM Systems," Proceedings of IEEE International Conference on Universal Personal Communications, 1995, the disclosure of which is incorporated by reference herein. However, this correlation method requires a large observation interval which is not practical for a sniffing BS.

Most mobile communication systems embed pilot symbols in OFDM signals. Timing synchronization may be achieved by further utilizing these pilot symbols. For illustration, FIG. 2 depicts a time-frequency plane on which pilot symbols are located, where the pilot symbols are arranged according to a LTE specification as an illustrative example. Consider a time instant 241. There are two pilot symbols 210, 220 separated by a frequency spacing 230. The presence of a timing offset is translated into a proportional phase shift for each of the two pilot symbols 210, 220. It follows that the timing offset can be estimated based on an observed phase shift between the two pilot symbols 210, 220. Since the observed phase shift has a $2\pi$ ambiguity, there is a maximum detection range of the timing offset that can be estimated. In many practical situations, the actual timing offsets often exceed this maximum detection range. US2014/0036779A1 and US7558245B2 provide timing-offset estimation methods that overcome this limitation, but these methods involve high implementation complexity.

There is a need in the art to have a timing-synchronization technique that utilizes pilot symbols to estimate a timing offset greater than the aforementioned maximum detection range. The technique is not only applicable for mobile communication systems but also useful for other wireless communication systems, such as a wireless local area network (WLAN) having multiple access points for coordinated transmission.

SUMMARY OF THE INVENTION

An aspect of the present invention is to provide a method for performing timing synchronization of a received OFDM signal. The received OFDM signal contains a plurality of pilot symbols including two pre-selected pilot symbols. The method comprises estimating a timing offset of the received OFDM signal from a reference sampling instant. The timing offset $N_{offset}$ is expressed as an integral number of sampling intervals.

The timing offset is estimated as follows. A maximum detection range of an estimable timing offset estimated solely by an observed phase shift between the two pre-selected pilot symbols in the received OFDM signal is determined. It follows that $N_{offset}$ is determined as $N_{offset} = i_{offset} N_{det} + N_{res}$ where $N_{det}$ is the maximum detection range, $i_{offset}$ is an integer to be determined and $N_{res}$ is a residual timing offset being positive, negative, or zero, with a magnitude not greater than half of $N_{det}$. The received OFDM signal is sampled over an OFDM symbol duration to obtain S, a sequence of $N_{FFT}$ OFDM-signal samples, wherein the sampling of the received OFDM signal starts from the reference sampling instant. The value $N_{FFT}$ is the number of samples used in demodulating one OFDM symbol. Based on a set of candidate integers selected for determining $i_{offset}$, a SINR computing process is repeated for each of the candidate integers. The SINR computing process for an individual candidate integer i comprises: computing $N_{mask} = |iN_{det}|$; when i>0, setting the first $N_{mask}$ samples of S to zeroes so as to yield $S_{mask}^{(i)}$, a masked sequence of OFDM-signal samples; when i<0, setting the last $N_{mask}$ samples of S to zeroes so as to yield $S_{mask}^{(i)}$; when i=0, setting $S_{mask}^{(i)} = S$; and computing a SINR of a constructed OFDM symbol given by $S_{mask}^{(i)}$. The value of $i_{offset}$ is determined such that the SINR computed for $S_{mask}^{(i_{offset})}$ is the greatest among all of the candidate integers.

Preferably, $N_{res}$ is determined according to the observed phase difference between the two pre-selected pilot symbols in S.

The method is implementable in a wireless transceiver comprising one or more processors configured to perform timing synchronization of a received OFDM signal by any of the embodiments of the disclosed method. The wireless transceiver may be implemented in a BS.

Other aspects of the present invention are disclosed as illustrated by the embodiments hereinafter.

DETAILED DESCRIPTION

The Inventors have made the following observation that leads to the development of the present invention.

Figure 1:
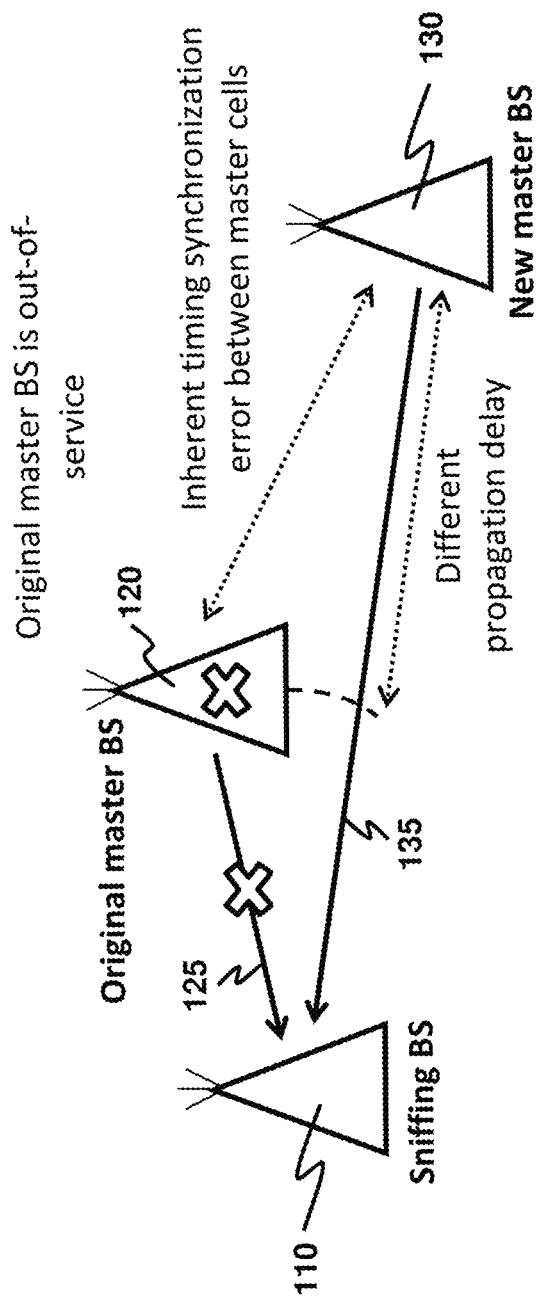
FIG. 1 illustrates a sniffing BS, originally time-synchronized with an original master BS, loses synchronization with this original master BS, so that the sniffing BS is required to synchronize with a new master BS.
Figure 3:
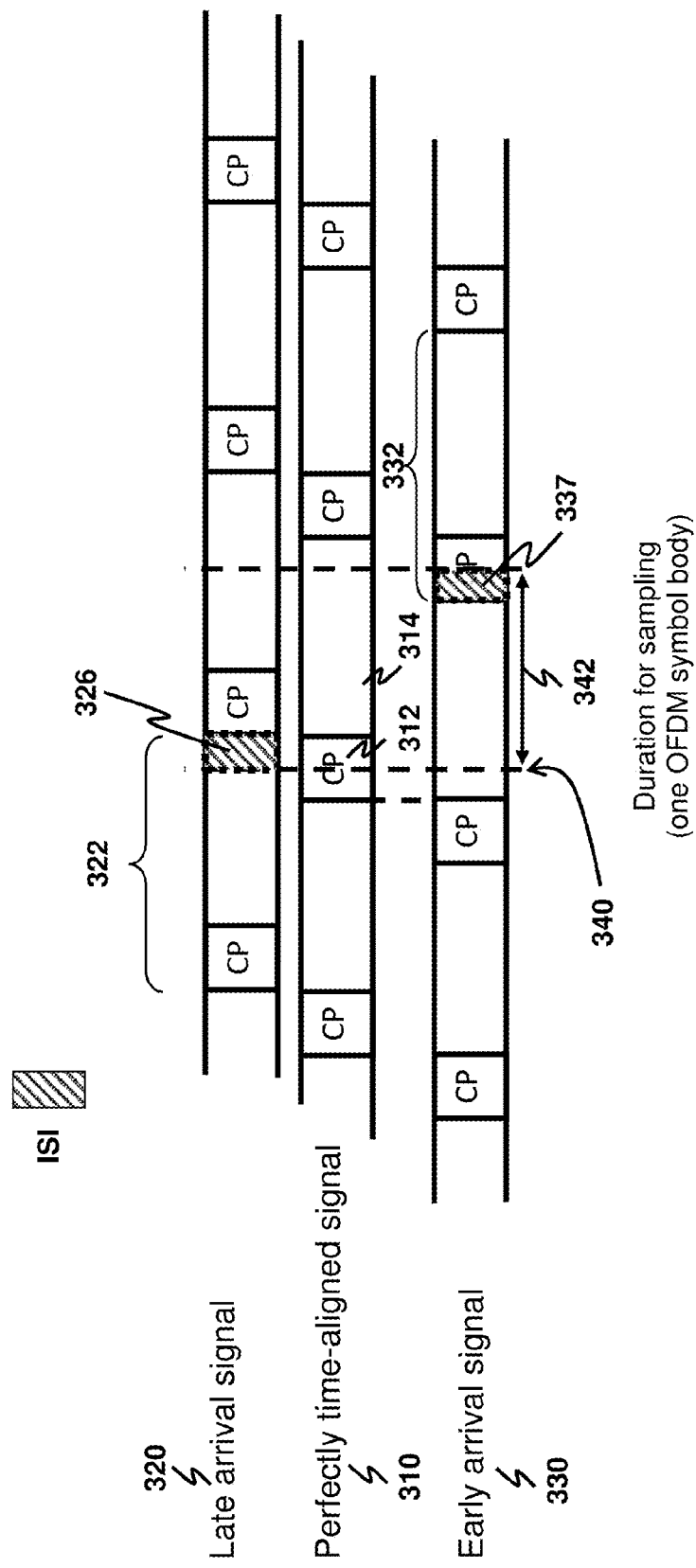
FIG. 3 plots three OFDM signals for comparison, the three OFDM signals being a perfectly time-aligned signal, a late arrival signal and an early arrival signal.

FIG. 3 plots three OFDM signals for comparison, a first one being a perfectly time-aligned signal 310, a second one being a late arrival signal 320, a third one being an early arrival signal 330. The situation as depicted in FIG. 1 is considered.

Without loss of generality, consider a reference sampling instant 340 that the sniffing BS 110 uses as a time reference. If an OFDM signal sent from the new master BS 130 is time-aligned at the reference sampling instant 340, the OFDM signal is the perfectly time-aligned signal 310. The OFDM signal has a cyclic prefix (CP) 312 preceding an OFDM symbol body 314. The reference sampling instant 340 is, as an example for illustration, in the middle of the CP 312. At the sniffing BS 110, the OFDM signal is sampled over a duration 342 of one OFDM symbol body, resulting in a sequence of OFDM-signal samples. Performing a fast Fourier transform (FFT) on this sequence recovers data symbols originally multiplexed in the OFDM signal.

If the OFDM signal from the new master BS 130 is arrived with a delay relative to the perfectly time-aligned signal 310, this OFDM signal is regarded as the late arrival signal 320. Without knowing the delay, the sniffing BS 110 still samples the late arrival signal 320 over the above-mentioned duration 342, and the obtained sequence of OFDM-signal samples contains a region 326 of intersymbol interference (ISI) at the front part of the obtained sequence due to an immediately adjacent OFDM symbol 322 in the late arrival signal 320. It follows that the late arrival signal 320 has a SINR that is smaller than a SINR of the perfectly time-aligned signal 310.

If the OFDM signal from the new master BS 130 is arrived earlier than the perfectly time-aligned signal 310, the OFDM signal is regarded as the early arrival signal 330. After sampling, the resultant sequence of OFDM-signal samples includes a region 337 of ISI at the rear part of the resultant sequence due to an immediately adjacent OFDM symbol 332 in the early arrival signal 330. Similarly, the early arrival signal 330 has a SINR smaller than the SINR of the perfectly time-aligned signal 310.

For the late arrival signal 320 or the early arrival signal 330, if the ISI is removed from the sequence of OFDM-signal samples, the resultant SINR is increased. If exactly the entire region 326 of ISI is removed from the late arrival signal 320 (or if exactly the entire region 337 of ISI is removed from the early arrival signal 330), the resultant SINR reaches a maximum. Hence, the timing offset of the OFDM signal sent from the new master BS 130 is estimable by masking out a portion of the OFDM-signal sample sequence and finding a length of this portion that leads to the maximum SINR. The present invention is developed based on this observation.

Although the present invention is hereinafter described in embodiments predominantly based on an example application of the invention to a LTE system or a LTE-Advanced system, the present invention is not limited only to a wireless communication system compliant to a LTE specification or a LTE-Advanced specification. The present invention is applicable to any wireless communication system requiring timing synchronization of a received OFDM signal where the signal contains a plurality of pilot symbols. Examples of such wireless communication system include a WiFi WLAN, and a Digital Video Broadcasting (DVB) system.

Figure 2:
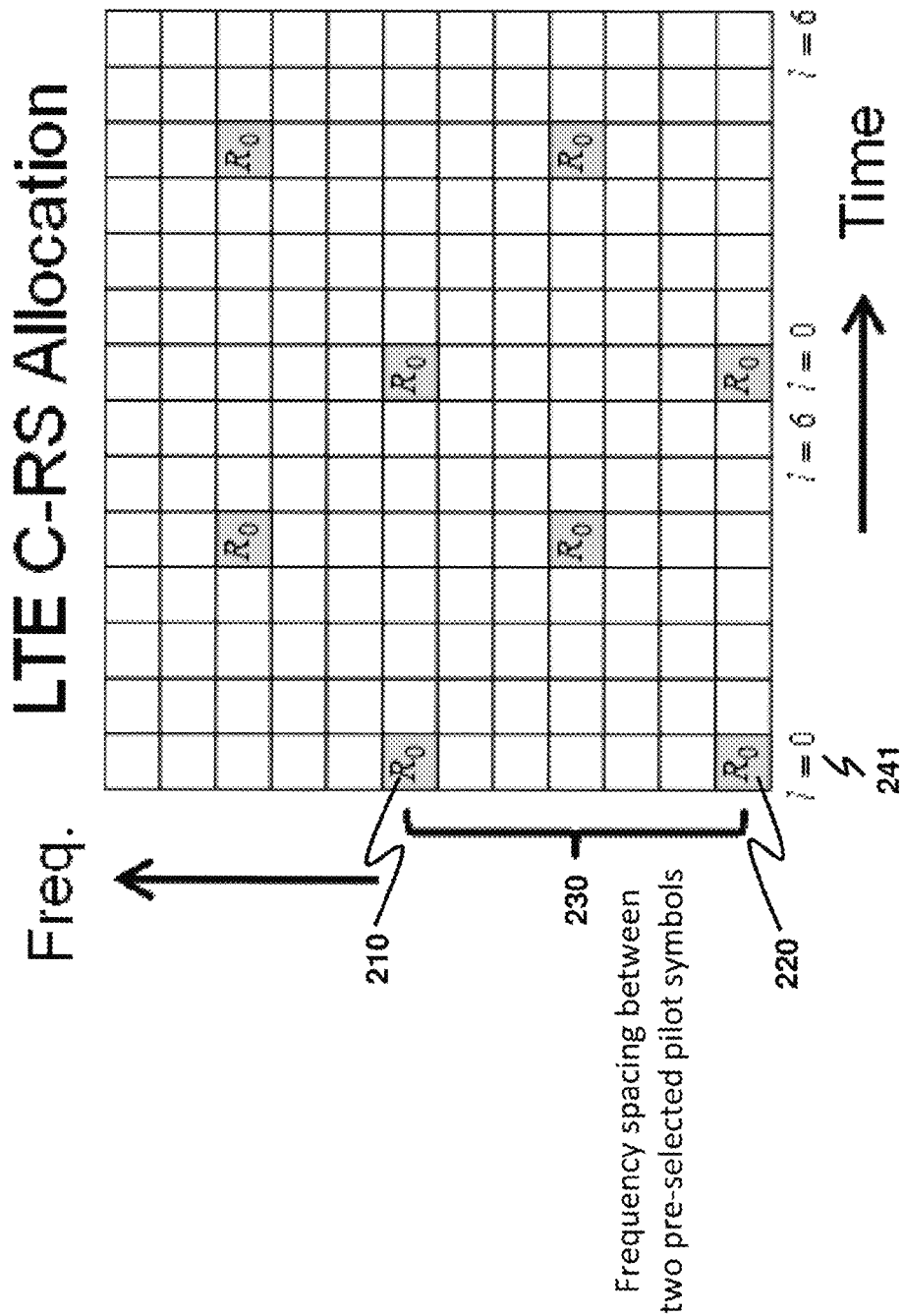
FIG. 2 depicts, as an example for illustration, a time-frequency plane on which pilot symbols are located, where the pilot symbols are arranged according to a LTE specification.

An aspect of the present invention is to provide a method for performing timing synchronization of a received OFDM signal. The received OFDM signal contains a plurality of pilot symbols including two pre-selected pilot symbols (e.g., the two pilot symbols 210, 220 shown in FIG. 2). The method comprises estimating a timing offset of the received OFDM signal where the timing offset is measured from a reference sampling instant (e.g., the reference sampling instant 340 shown in FIG. 3). Instead of specifying the timing offset as a physical time, herein the timing offset is more conveniently expressed as an integral number of sampling intervals (for facilitating digital implementation of the method). The timing offset can be positive, negative, or zero. (See the three cases of FIG. 3 above.) The timing offset is denoted as $N_{offset}$.

Figure 4:
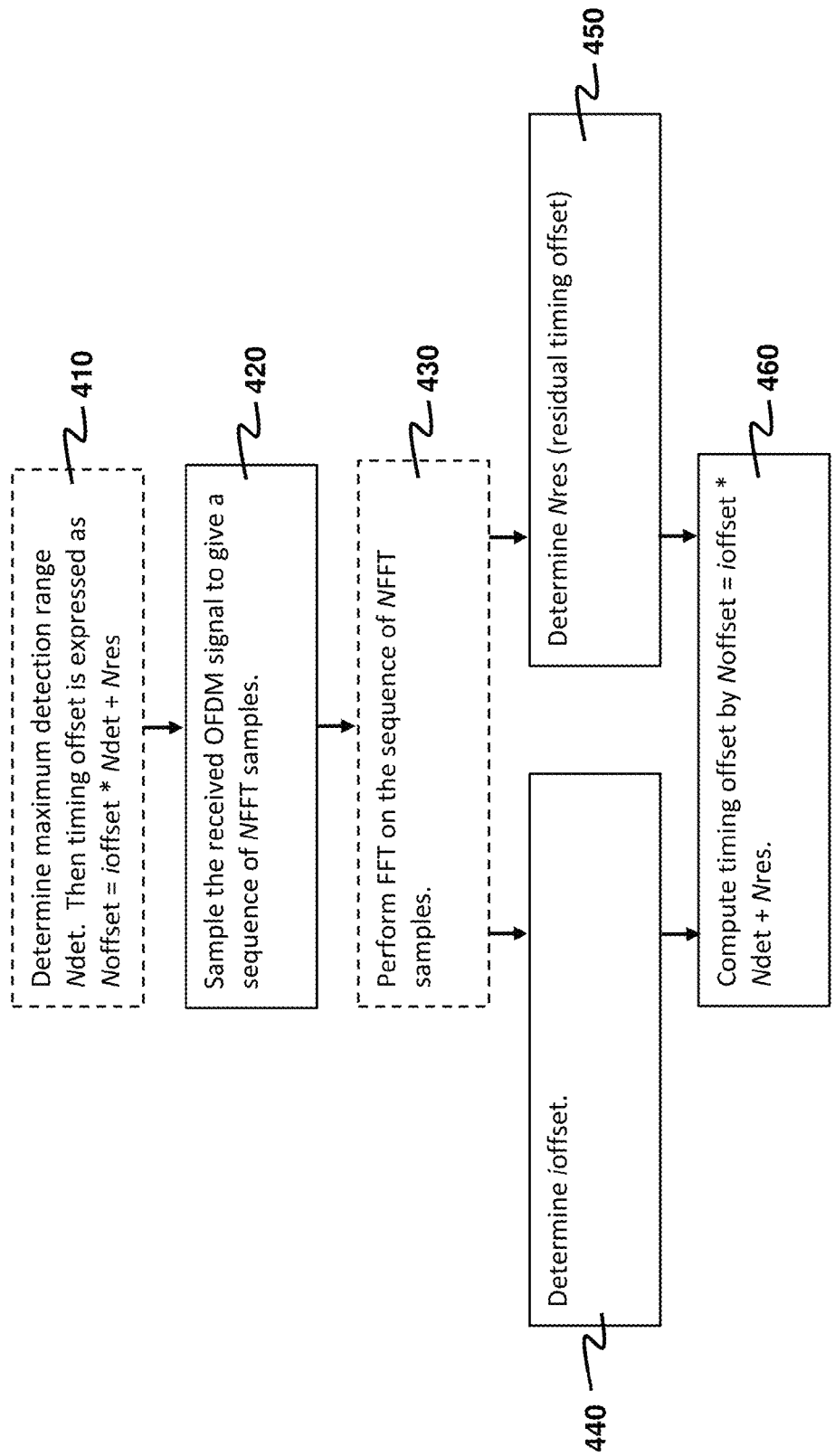
FIG. 4 depicts a flowchart showing the steps for estimating a timing offset according to an exemplary embodiment of the present invention.

The estimation of the timing offset is exemplarily illustrated with an aid of FIG. 4, which depicts a flowchart showing the steps for estimating the timing offset according to an exemplary embodiment of the present invention.

In a step 420, the OFDM signal is sampled over an OFDM symbol duration to obtain S, a sequence of $N_{FFT}$ OFDM-signal samples, wherein the sampling of the received OFDM signal starts from the reference sampling instant. Denote S as $$S = \{s_1, s_2, \ldots, s_{N_{FFT}}\} \quad (1)$$

where $s_l$, $1 \leq l \leq N_{FFT}$, is the l th OFDM-signal sample. The number $N_{FFT}$, which is a pre-determined value and is often chosen to be a power of 2 for digital implementation, is the number of samples used in demodulating one OFDM symbol.

After S is obtained, it is preferable to perform a FFT on S to yield a sequence of $N_{FFT}$ FFT outputs (step 430).

Before sampling the received OFDM signal is performed in the step 420, it is often advantageous to determine a maximum detection range of an estimable timing offset estimated solely by an observed phase difference between the two pre-selected pilot symbols (step 410). The maximum detection range is determined according to a frequency spacing between the two pre-selected pilot symbols (e.g., a frequency spacing 230 of the two pilot symbols 210, 220 in FIG. 2). In particular, the maximum detection range, $N_{det}$, may be determined by $$N_{det}=q[N_{FFT}/\Delta n], \quad (2)$$

where $\Delta n$ is the number of one or more subcarrier spacings between the two pre-selected pilot symbols, and $q[x]$ is a function of converting x to a nearest integer. For example, a sniffing BS in a LTE network may listen to a Downlink Cell-Specific Reference Signal (C-RS) from other BSs, and two pilot symbols in the Downlink C-RS are separated by six subcarrier spacings. In this case, one has $\Delta n=6$. If the LTE network uses $N_{FFT}=2048$, one has that $N_{FFT}/\Delta n=341.333$ and that $N_{det}=341$.

After $N_{det}$ is determined, the timing offset $N_{offset}$ is determinable as $$N_{offset}=i_{offset}N_{det}+N_{res}, \quad (3)$$

where $i_{offset}$ is an integer to be determined and $N_{res}$ is a residual timing offset. The residual timing offset is positive, negative, or zero, with a magnitude not greater than half of $N_{det}$. Note that $i_{offset}$ is the quotient of dividing the timing offset $N_{offset}$ by the maximum detection range $N_{det}$. Also note that the timing offset is expressed as an integer multiple of the maximum detection range plus the residual timing offset. It follows that $i_{offset}$ is a multiplying integer for the maximum detection range in obtaining the timing offset. As $N_{offset}$ can be positive, negative, or zero, it follows that $i_{offset}$ may also be positive, negative, or zero.

The value $i_{offset}$ and the value of $N_{res}$ are estimated in a step 440 and a step 450, respectively. Afterwards, the estimated values of $i_{offset}$ and $N_{res}$ are substituted into (3) to compute $N_{offset}$ in a step 460. Although FIG. 4 shows that the two steps 440, 450 are performed in parallel because, as will be shown later, estimation processes for $i_{offset}$ and for $N_{res}$ are independent, it is also possible that execution of the step 440 precedes execution of the step 450, or vice versa.

Figure 5:
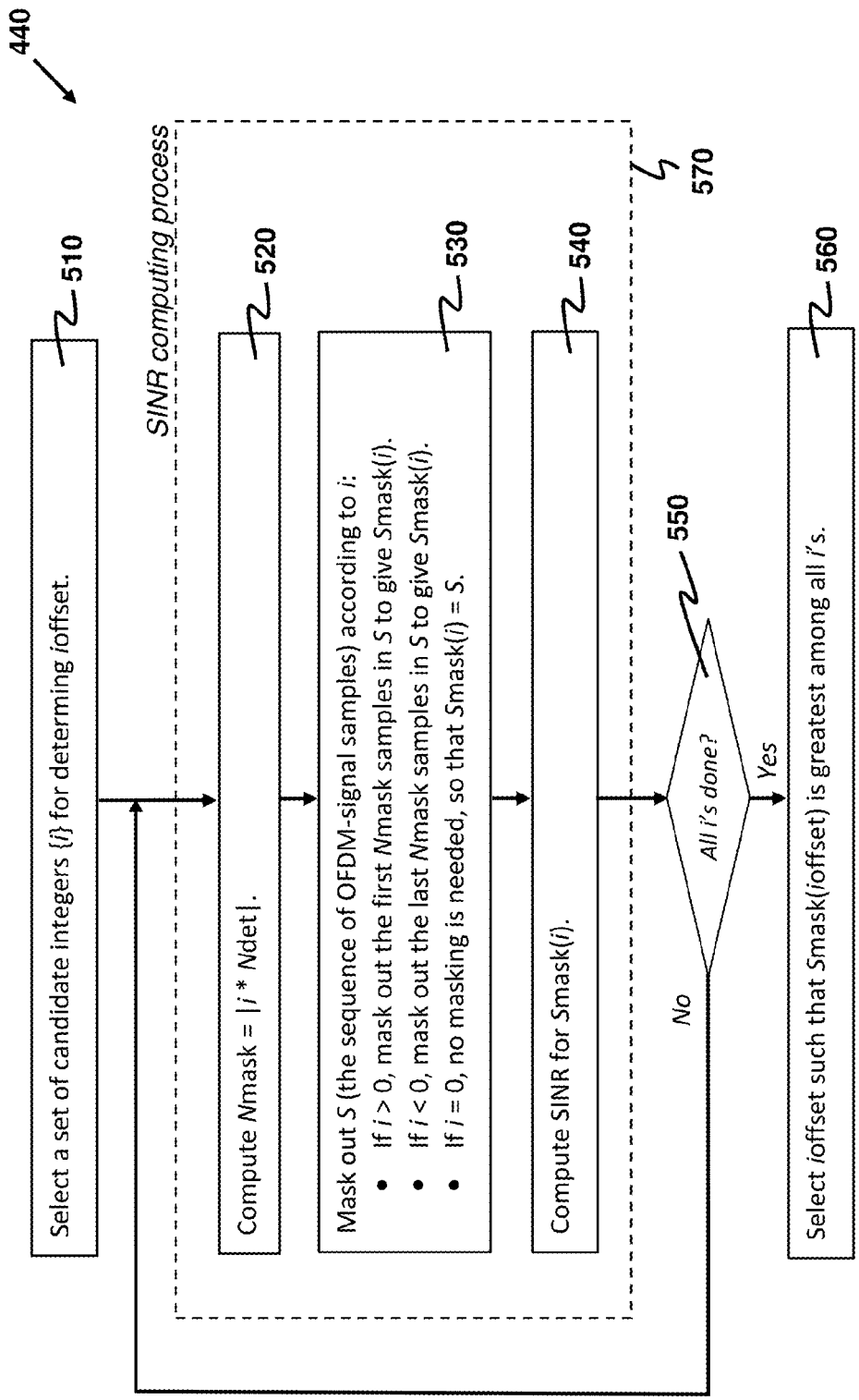
FIG. 5 depicts, in accordance with the exemplary embodiment of the present invention, a flowchart showing estimation of a value of $i_{offset}$, the quotient of dividing the timing offset by the maximum detection range.

FIG. 5 depicts a flowchart showing an exemplary embodiment of estimating the value of $i_{offset}$ in the step 440.

First, a set of candidate integers, {i}, for determining $i_{offset}$ is selected in a step 510. Each of the candidate integers can be positive, negative or zero. One choice of {i} is that this set consists of integers satisfying $-i_{max} \le i \le i_{max}$ for a certain value of $i_{max}$ determined by one skilled in the art according to a practical situation.

A SINR computing process 570 is then repeated for each of the candidate integers (step 550). The SINR computing process 570 for an individual candidate integer i includes steps 520, 530 and 540. In the step 520, compute $N_{mask}$ by $N_{mask}=|iN_{det}|$ where $N_{mask}$ is the number of OFDM-signal samples in S to be masked out (i.e. to be set to zeroes). The $N_{mask}$ samples in S are then masked out in the step 530 based on the following three rules. If i>0, the first $N_{mask}$ samples of S are masked out to zeroes so that $S_{mask}^{(i)}$, a masked sequence of OFDM-signal samples under i, is given by $$S_{mask}^{(i)}=\{0,0,\ldots,0,s_{N_{mask}+1},s_{N_{mask}+2},\ldots,s_{N_{FFT}}\}. \quad (4a)$$

If i<0, the last $N_{mask}$ samples of S are set to zeroes such that $S_{mask}^{(i)}$ is given by $$S_{mask}^{(i)}=\{s_1,s_2,\ldots,s_{N_{FFT}-N_{mask}},0,0,\ldots,0\}. \quad (4b)$$

In case i=0, no masking is required so that $$S_{mask}^{(i)}=S. \quad (4c)$$

In the step 540, a SINR value of a constructed OFDM symbol given by $S_{mask}^{(i)}$ is computed. Preferably, the SINR value is computed by first obtaining FFT outputs of $S_{mask}^{(i)}$ and then extracting, from the obtained FFT outputs, a set of particular FFT outputs corresponding to the plurality of pilot symbols. The SINR is computed from the set of particular FFT outputs.

After the values of SINR for all the candidate integers are computed, $i_{offset}$ is determined such that the SINR computed for $S_{mask}^{(i_{offset})}$ is the greatest among all of the candidate integers (step 560).

Figure 6:
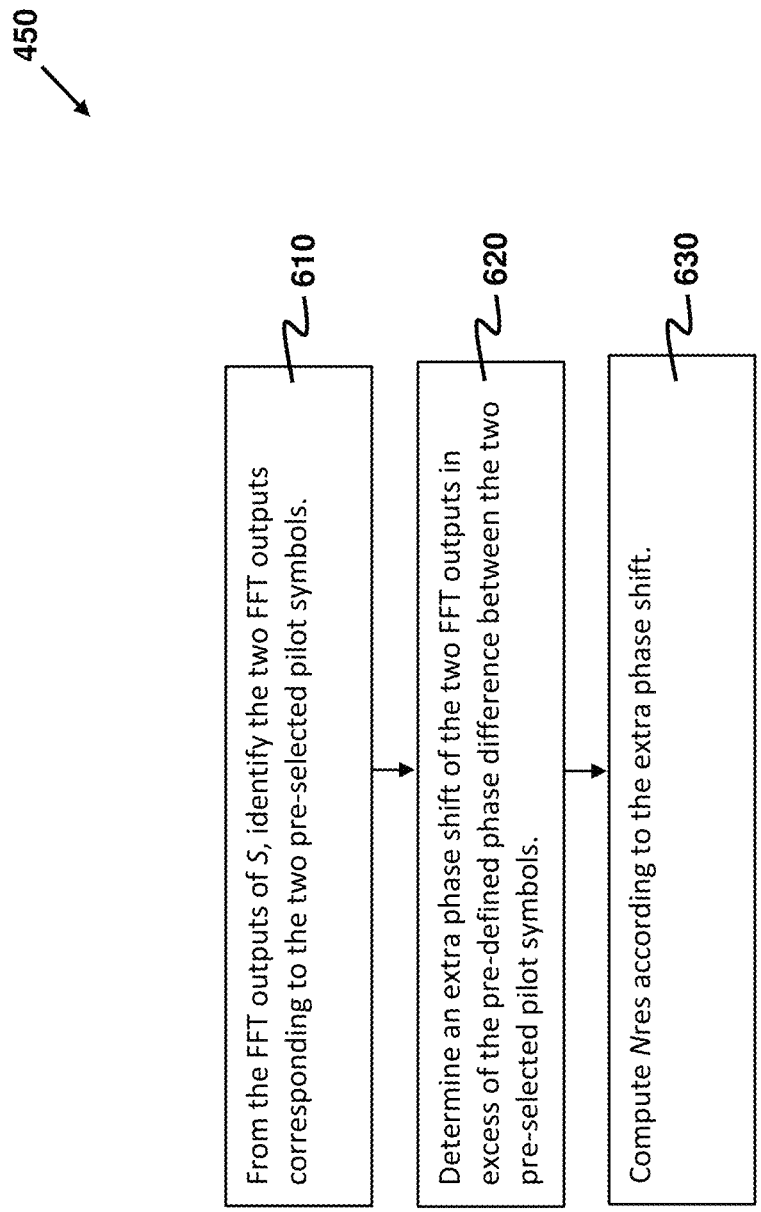
FIG. 6 depicts, in accordance with one embodiment of the present invention, a flowchart showing estimation of the residual timing offset.

FIG. 6 depicts a flowchart showing one embodiment of estimating the value of $N_{res}$ in the step 450.

From the $N_{FFT}$ FFT outputs obtained in the step 430, identify the two FFT outputs that correspond to the two pre-selected pilot symbols (step 610). Then an extra phase shift, $\varphi \in (-\pi, \pi]$, between the two FFT outputs in excess of a pre-defined phase difference between the two pre-selected pilot symbols is computed in a step 620. For convenience, among the two pre-selected pilot symbols, denote a first pre-selected pilot symbol as the one pilot symbol located at a lower subcarrier than another pilot symbol, which is denoted as a second pre-selected pilot symbol. Specifically, $\varphi$ is computed by $$\varphi=(v_2-v_1)-(\theta_2-\theta_1) \quad (5)$$

with $\varphi$ restricted to satisfy $\varphi \in (-\pi, \pi]$, where: $\theta_2$ is a pre-defined phase of the second pre-selected pilot symbol; $\theta_1$ is a pre-defined phase of the first pre-selected pilot symbol; $v_2$ is a phase of the FFT output corresponding to the second pre-selected pilot symbol; and $v_1$ is a phase of another FFT output corresponding to the first pre-selected pilot symbol. Note that $\theta_2-\theta_1$ is the pre-defined phase difference between the two pre-selected pilot symbols. In a step 630, $N_{res}$ is computed by $$N_{res}=q[-(2\pi)^{-1}\varphi \times N_{FFT}/\Delta n]. \quad (6)$$

Figure 7:
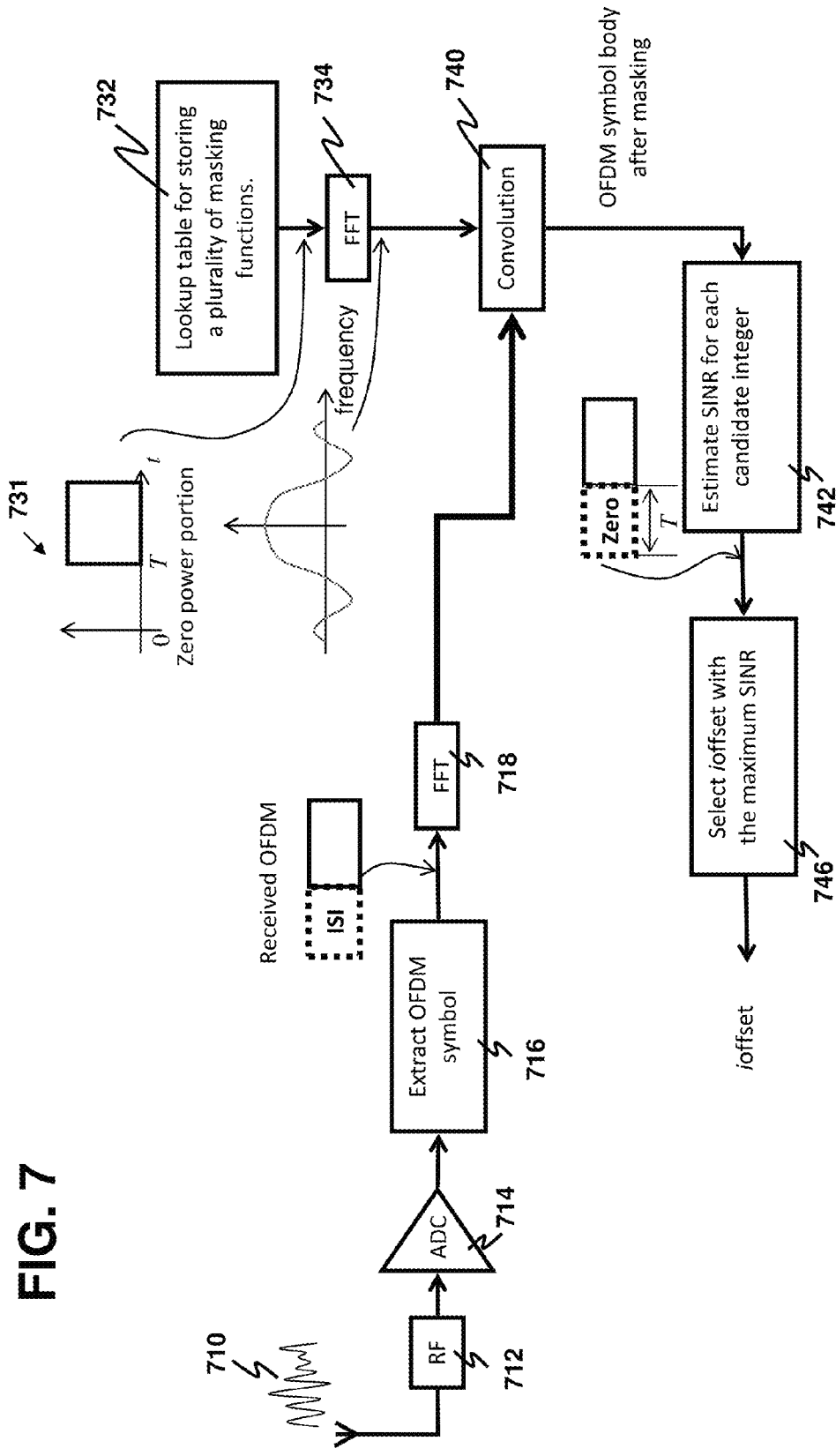
FIG. 7 depicts one arrangement for estimating the value of $i_{offset}$.

FIG. 7 depicts an arrangement for estimating the value of $i_{offset}$ according to one embodiment of the present invention. An OFDM signal 710 is received at a radio-frequency (RF) front end 712, where the signal 710 is the converted into digital format by an analog-to-digital converter (ADC) 714. One OFDM symbol of the signal 710 in digital format is extracted (block 716) and is performed with a FFT (block 718). The FFT output of the block 718 is convolved (block 740) with an FFT output (block 734) of a masking function 731. A plurality of masking functions is stored in a look-up table 732 such that the desired masking function 731 for a given candidate integer i can be read out without a need to generate it. The output of convolution (block 740) is then a constructed OFDM symbol, represented in the frequency domain, after masking. The SINR is then estimated for each candidate integer (block 742). Finally, $i_{offset}$ is determined (block 746) as a particular candidate integer having the maximum SINR among all candidate integers that are considered.

Figure 8:
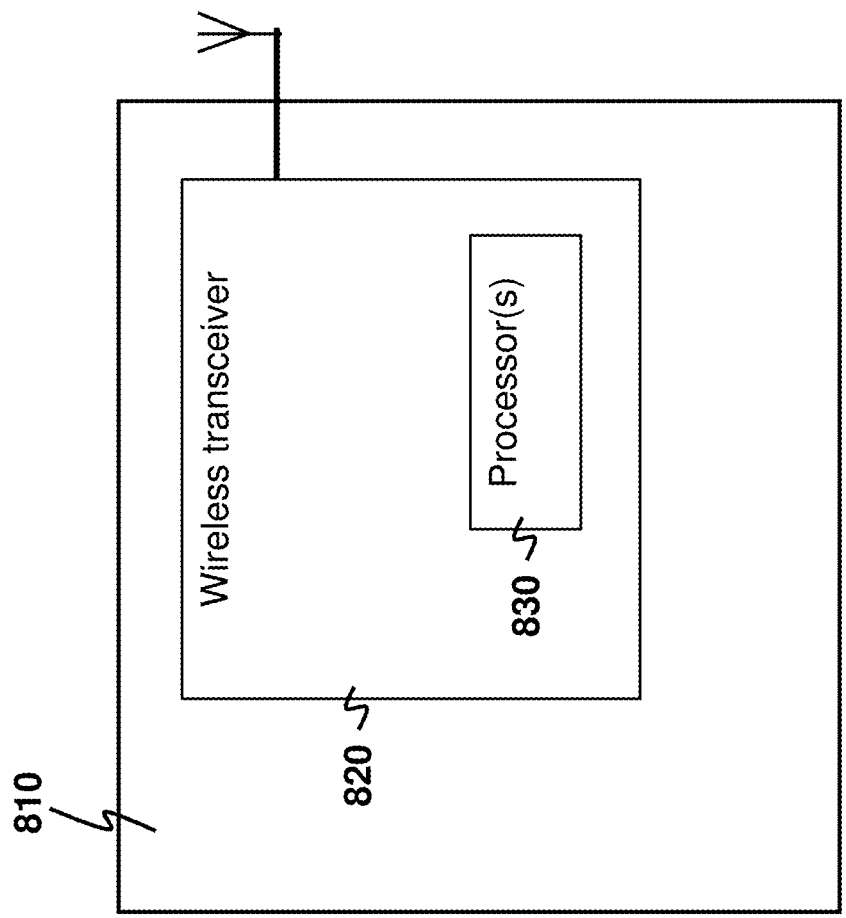
FIG. 8 plots, for illustration, a wireless transceiver implemented in a radio communication device where the wireless transceiver employs an embodiment of the present invention in establishing timing synchronization with a received OFDM signal.

Each of the embodiments of the method disclosed herein is implementable in a wireless transceiver. For illustration, FIG. 8 depicts a wireless transceiver 820 implemented in a radio communication device 810. Examples of the radio communication device 810 include a BS for a mobile communication system, an access point (AP) for a WLAN, and a digital television for use in a digital broadcasting system. The wireless transceiver 820 comprises one or more processors 830 configured to execute a process for performing timing synchronization of a received OFDM signal according to any embodiment of the method disclosed above.

The one or more processors 830 may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings regarding the method.

The method disclosed herein is usable for a sniffing BS to establish BS synchronization with another BS in a mobile communication system. Given a BS comprising one or more processors configured to execute a process of establishing BS synchronization with another BS in the mobile communication system, the BS-synchronization establishing process comprises performing timing synchronization of a received OFDM signal sent from the aforesaid another BS. In particular, the timing synchronization of the received OFDM signal is realized according to any of the embodiments of the method disclosed herein.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for performing timing synchronization of a received orthogonal frequency division multiplexing (OFDM) signal, the received OFDM signal containing a plurality of pilot symbols including two pre-selected pilot symbols, the method comprising estimating a timing offset of the received OFDM signal from a reference sampling instant, the timing offset, $N_{offset}$, being expressed as an integral number of sampling intervals, wherein the estimating of the timing offset comprises:

determining a maximum detection range of an estimable timing offset estimated solely by an observed phase shift between the two pre-selected pilot symbols in the received OFDM signal, whereby $N_{offset}$ is determined as $N_{offset} = i_{offset} N_{det} + N_{res}$ where $N_{det}$ is the maximum detection range, $i_{offset}$ is an integer to be determined and $N_{res}$ is a residual timing offset being positive, negative, or zero, with a magnitude not greater than half of $N_{det}$;

sampling the received OFDM signal over an OFDM symbol duration to obtain S, a sequence of $N_{FFT}$ OFDM-signal samples, wherein the sampling of the received OFDM signal starts from the reference sampling instant, and $N_{FFT}$ is the number of samples used in demodulating one OFDM symbol;

based on a set of candidate integers selected for determining $i_{offset}$, repeating a signal to interference plus noise (SINR) computing process for each of the candidate integers, wherein the SINR computing process for an individual candidate integer i comprises the steps of:

(a) computing $N_{mask} = |iN_{det}|$;
   (b) when i>0, setting the first $N_{mask}$ samples of S to zeroes so as to yield $S_{mask}^{(i)}$, a masked sequence of OFDM-signal samples under i;
   (c) when i<0, setting the last $N_{mask}$ samples of S to zeroes so as to yield $S_{mask}^{(i)}$;
   (d) when i=0, setting $S_{mask}^{(i)} = S$; and
   (e) computing a SINR of a constructed OFDM symbol given by $S_{mask}^{(i)}$;

determining $i_{offset}$ such that the SINR computed for $S_{mask}^{(i_{offset})}$ is the greatest among all of the candidate integers;

determining $N_{res}$ according to the observed phase difference between the two pre-selected pilot symbols in S; and computing $N_{offset}$ according to both $i_{offset}$ and $N_{res}$ such that the timing offset of the received OFDM signal is estimated regardless of whether the timing offset exceeds the maximum detection range.

2. The method of claim 1, further comprising:
   performing a fast Fourier transform (FFT) on S to yield a sequence of $N_{FFT}$ FFT outputs;
   wherein the determining of $N_{res}$ comprises:
       from the $N_{FFT}$ FFT outputs, identifying the two FFT outputs that correspond to the two pre-selected pilot symbols;
       determining an extra phase shift, $\varphi \in (-\pi, \pi]$, between the two FFT outputs in excess of a pre-defined phase difference between the two pre-selected pilot symbols; and
       computing $N_{res}$ by $N_{res} = q[-(2\pi)^{-1} \varphi \times N_{FFT}/\Delta n]$ where $\Delta n$ is the number of one or more subcarrier spacings between the two pre-selected pilot symbols, and $q[x]$ is a function of converting x to a nearest integer.

3. The method of claim 1, wherein $N_{det}$ is determined by $N_{det} = q[N_{FFT}/\Delta n]$ where $\Delta n$ is the number of one or more subcarrier spacings between the two pre-selected pilot symbols, and $q[x]$ is a function of converting x to a nearest integer.

4. The method of claim 1, further comprising:
   performing a fast Fourier transform (FFT) on S to yield a sequence of $N_{FFT}$ FFT outputs;
   wherein:
       $S_{mask}^{(i)}$ in each of the steps (b) and (c) is obtained by convolving the sequence of $N_{FFT}$ FFT outputs with a Fourier transform of a time-domain masking function constructed according to where the zeroes are set in S.

5. The method of claim 4, wherein the masking function is read from a look-up table.

6. The method of claim 1, wherein the received OFDM signal has a signal format compliant to a Long Term Evolution (LTE) specification, a LTE-Advanced specification, a WiFi standard, or a Digital Video Broadcasting (DVB) specification.

7. A wireless transceiver comprising one or more processors configured to execute a process for performing timing synchronization of a received orthogonal frequency division multiplexing (OFDM) signal according to the method of claim 1.

8. A wireless transceiver comprising one or more processors configured to execute a process for performing timing synchronization of a received orthogonal frequency division multiplexing (OFDM) signal according to the method of claim 2.

9. A wireless transceiver comprising one or more processors configured to execute a process for performing timing synchronization of a received orthogonal frequency division multiplexing (OFDM) signal according to the method of claim 3.

10. A wireless transceiver comprising one or more processors configured to execute a process for performing timing synchronization of a received orthogonal frequency division multiplexing (OFDM) signal according to the method of claim 4.

11. A base station (BS) used for a mobile communication network, wherein the BS comprises the wireless transceiver of claim 7.

12. A base station (BS) comprising one or more processors configured to execute a process of establishing BS synchronization with another BS in a mobile communication system, wherein:
the BS-synchronization establishing process comprises performing timing synchronization of a received orthogonal frequency division multiplexing (OFDM) signal sent from the aforesaid another BS; and
the performing of timing synchronization of the received OFDM signal is arranged according to the method of claim 1.

13. A base station (BS) comprising one or more processors configured to execute a process of establishing BS synchronization with another BS in a mobile communication system, wherein:
the BS-synchronization establishing process comprises performing timing synchronization of a received orthogonal frequency division multiplexing (OFDM) signal sent from the aforesaid another BS; and
the performing of timing synchronization of the received OFDM signal is arranged according to the method of claim 2.

14. A base station (BS) comprising one or more processors configured to execute a process of establishing BS synchronization with another BS in a mobile communication system, wherein:
the BS-synchronization establishing process comprises performing timing synchronization of a received orthogonal frequency division multiplexing (OFDM) signal sent from the aforesaid another BS; and
the performing of timing synchronization of the received OFDM signal is arranged according to the method of claim 3.

15. A base station (BS) comprising one or more processors configured to execute a process of establishing BS synchronization with another BS in a mobile communication system, wherein:
the BS-synchronization establishing process comprises performing timing synchronization of a received orthogonal frequency division multiplexing (OFDM) signal sent from the aforesaid another BS; and
the performing of timing synchronization of the received OFDM signal is arranged according to the method of claim 4.

16. A base station (BS) comprising one or more processors configured to execute a process of establishing BS synchronization with another BS in a mobile communication system, wherein:
the BS-synchronization establishing process comprises performing timing synchronization of a received orthogonal frequency division multiplexing (OFDM) signal sent from the aforesaid another BS; and
the performing of timing synchronization of the received OFDM signal is arranged according to the method of claim 5.

17. The BS of claim 12, wherein the mobile communication network is compliant to a Long Term Evolution (LTE) specification or a LTE-Advanced specification.

\* \* \* \* \*